Patented June 11, 1935

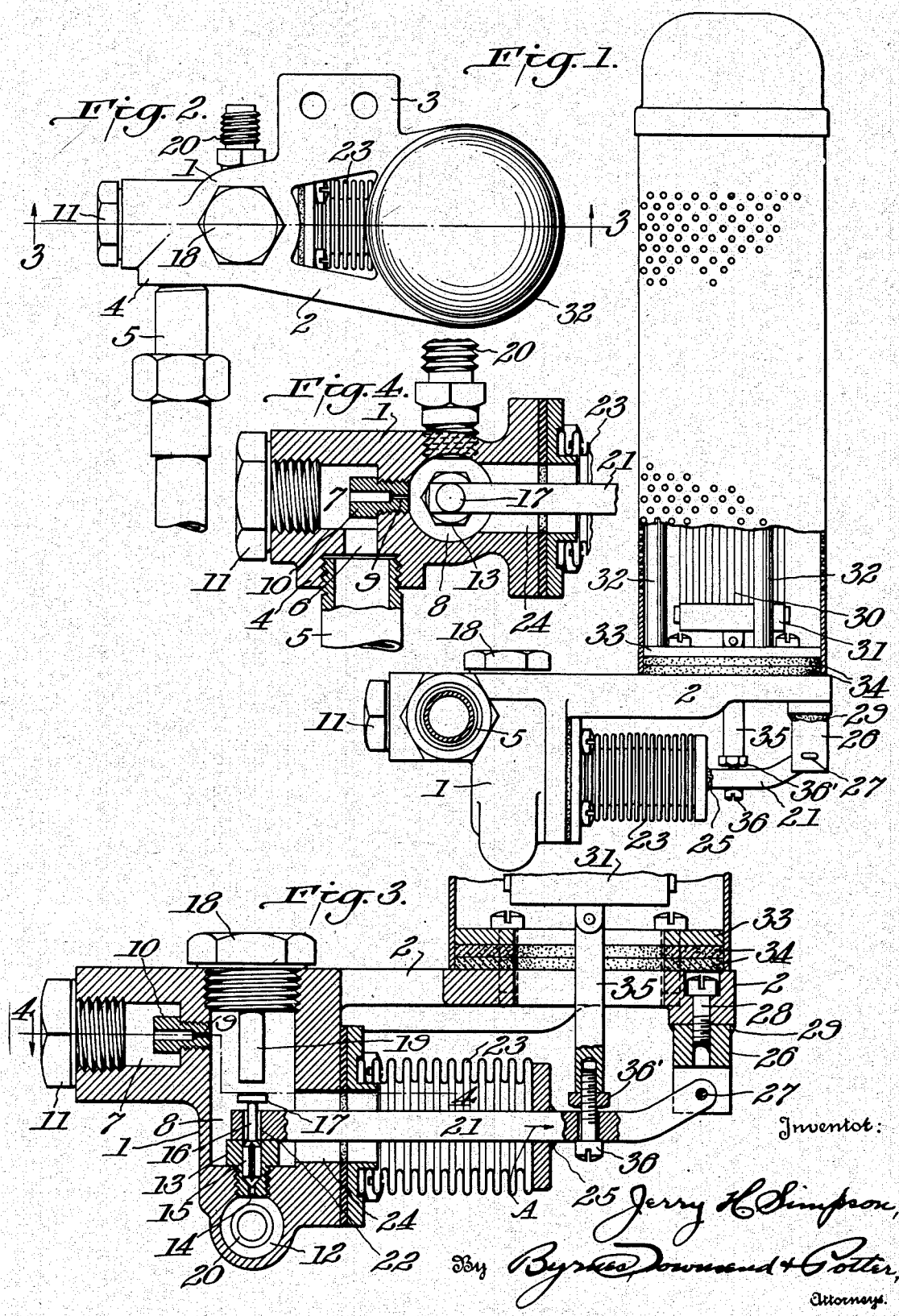

2,004,251

UNITED STATES PATENT OFFICE 2,004,251

HUMIDITY CONTROLLED VALVE

Jerry H. Simpson, Winston-Salem, N. C., assignor to The Bahnson Company, Winston-Salem, N. C., a corporation of North Carolina Application August 30, 1932, Serial No. 631,089

10 Claims. (Cl. 236—44)

This invention relates to humidity controlled valves and particularly to valves for automatically regulating the supply of water to a humidifier system in accordance with the humidity at the point of control.

An object of the invention is to provide a simple and rugged valve construction which, however, is relatively sensitive to changes in humidity. An object is to provide a humidity controlled valve which will close quickly when the humidity reaches a predetermined value and which, in general, will open quickly when the humidity falls below a definite value. A further object is to provide a humidity controlled valve which includes a water-tight, packless and flexible joint between the valve operator and the valve casing. More particularly, an object is to provide a valve including an operating lever that extends through a flexible metallic bellows forming part of the valve housing, the arrangement being such that the water pressure on the bellows opposes movement of the operating lever by the hygrostatic control element of the valve.

These and other objects and advantages of the invention will be apparent from the following specification when taken with the accompanying drawing, in which Fig. 1 is a side elevation of one embodiment of the invention;

Fig. 2 is a plan view of the same;

Fig. 3 is a fragmentary vertical section substantially on line 3—3 of Fig. 2; and Fig. 4 is a fragmentary horizontal section on line 4—4 of Fig. 3.

In the drawing, the reference numeral 1 identifies the valve casing which may be, and preferably is, integral with a skeleton bracket 2 that carries the hygrostatic control unit and is provided with an appropriate means, such as the apertured lug 3, for securing the control valve to a support.

The valve casing is provided with a threaded nipple 4 for receiving a coupling member 5 that provides a convenient means for connecting the valve to a water supply pipe, not shown. A port 6 at the inner end of the nipple opens into an inlet chamber 7 that communicates with the valve chamber 8 through the calibrated or measuring orifice 9 in a bushing 10. To permit inspection of the calibrated bushing, or its replacement by one having a passage of different size, a removable plug 11 is threaded into the casing 1 in alinement with the bushing.

The valve chamber 8 is separated from the outlet passage or chamber 12 by a wall in which a seat member 13 is threaded, the seat member having an outlet 14 which is substantially larger than the calibrated opening 9 of the measuring bushing. The upper portion of the member 13 is counterbored to provide a guideway in which the lower cylindrical portion 15 of the valve member has a loose fit, and to provide a conical seat for the valve. The portion 15 of the valve is grooved or fluted to permit the flow of water through the counterbore when the lower conical end of the valve is raised from its seat and, above the fluted portion 15 the valve member has a portion 16 of reduced diameter which terminates in an enlarged head 17.

A removable plug 18 is threaded into the casing 1 in line with the valve member and terminates in an extension 19 which limits the lift of the valve. One wall of the outlet chamber 12 is provided with a threaded port to receive a pipe coupling 20 for connecting the valve to the water pipe leading to the humidifier or humidifier system, not shown.

The operating member for the valve comprises a lever 21 which has an opening 22 of less diameter than the enlarged valve head 17 but through which the cylindrical portion 15 of the valve may be forced with a press fit, this arrangement preventing accidental separation of the operating lever and the valve member in the event that the valve casing is inverted when the plug 18 is removed from the casing. The clearances between the portion 16 of the valve and the wall of the lever opening 22, and between the cylinder part 15 of the valve and the seat member 13 permit the valve member to center itself automatically on the valve seat when the valve closes.

The lever 21 extends to the exterior of the valve casing through, and axially of, a sylphon bellows 23 which is clamped over an enlarged opening 24 in that wall of the valve chamber 8 which is adjacent the hygrostatic element. The bellows proper is soldered or welded to its end members and solder 25 is applied, where the lever 21 passes through the bellows, to make that joint water tight. The outer end of the lever 21 is bent upwardly or at an angle to the axis of the sylphon bellows and is pivotaly connected to a lug 26 by a cotter pin 27. To permit a free pivotal movement of lever 21 when it is in its proper position, the lug 26 is connected to bracket 2 by a bolt 28 which has some clearance in the bracket.

The lever is adjusted with the bolt 28 loose and, after tightening the bolt to clamp the lug 26 in place, solder 29 is applied to fix the lug 26 and the lever pivot 27 in that adjustment.

The hygroscopic control unit is preferably of the type including a plurality of strands of paper which are uniformly loaded, the tensile stress and number of strands being so related that the load on the paper will never exceed its elastic limit. Control units of this type are described in detail in Patent No. 1,804,079 of Frederic F. Bahnson, and in his copending application Serial No. 478,761, filed Aug. 29, 1930.

As shown, the control element comprises a plurality of strands of paper 30 which extend between a lower movable frame 31 and an upper and relatively fixed frame, not shown, which is mounted upon rods 32 that are fixed to an annular base 33. Annular plates 34 of heat insulating material, such as molded phenolic resins, are arranged between the base 33 and the bracket 2. Both the skeleton form of the bracket and the heat insulation are essential when, as is frequently the case, the temperature of the water passing through the valve casing differs materially from room temperature. When the transfer of heat is not thus eliminated or reduced, relatively cold or relatively hot water in the valve casing may cause such uncontrolled changes in the dimensions of the supporting rods 32 as to produce a marked variation in the intended constant humidity.

The lower frame 31 is pinned to a connecting rod 35, and a bolt 36 extends loosely through the lever 21 and is threaded into the rod 35, being locked in place by a nut 36'.

The operation of the control unit is as follows: Assuming that the humidity is at or above the predetermined value which is to be established by the controlled flow of water to a humidifier system, the hygrostat exerts little or no upward pull upon the lever 21, the valve member is seated and water under pressure fills the inlet chamber 7, the valve chamber 8 and sylphon bellows 23. This water pressure tends to expand the bellows, thus exerting a force on lever 21 in the direction indicated by the arrow A. Since the pivot pin 27 lies above the line of application of this force, the free end of lever 21 is pressed downwardly upon the seat member 13, and the valve member is held in closed position by the water pressure in the valve chamber 8.

With decreasing humidity, the paper strands 30 contract and raise the lever against the pressure exerted by the sylphon bellows. At the predetermined value for which the hygrostatic control element is adjusted, the lever 21 engages the enlarged head 17 and lifts the valve from its seat, thus permitting water to flow to the humidifier system to maintain the desired humidity. The subsequent expansion of the paper strands with increasing humidity permits the lever 21 to fall and the flow of water forces the valve to its seat.

Particular attention is directed to the fact that the valve passage 14 is much larger than the calibrated orifice 9. The significance of this relationship is that the water pressure in valve chamber 8 is greatly reduced when the valve opens. The force exerted by the sylphon bellows is thereby greatly reduced and the valve moves quickly to full open position.

Similarly, when the valve approaches its fully closed position, the pressure builds up rapidly in the chamber 8 and the sylphon bellows, and moves the lever 21 quickly to its extreme lower position, thus permitting the valve to seat quickly and completely. This method of operation is in marked contrast to the present practice in designing flow control valves to provide a flow which is graduated in accordance with the quantity of water required to maintain constant humidity. While such methods are theoretically desirable, experience has shown that it is sometimes difficult to effect a full closure of the valve when this gradual opening and closing method is employed. The present valve will close rapidly and completely and, except possibly under unusual conditions, will open rapidly. With a sensitive and accurate control, and a proper choice of the size of the calibrated orifice 9, no difficulty is experienced in maintaining the desired humidity when the control valve is moved rapidly between its extreme positions.

The present invention has the further advantage that the hygroscopic element operates only through short periods of time in opening and in closing the valve, thus avoiding the possibility of fatigue over a long period of operation of the humidifier system. This operating condition, and the use of tensile stresses well below the elastic limit of the paper strand, provides accurate control over long periods and without the necessity of frequent adjustments or calibrations of the control unit.

The several parts of the valve may be made of any appropriate materials. The measuring orifice bushing 10, the valve seat member 13 and the valve are preferably formed of monel metal, while the casing and bracket may be of brass.

It will be apparent that the sensitivity of the control is determined by the amount of offset between the axis of the main portion of lever 21 and its pivot point, by the clearance between the valve head 17 and the lever 21 when the valve is seated, and by the relative length of the lever arms.

While I have illustrated a preferred embodiment of the invention, it is to be understood that various changes may be made in the several parts and in their relative size, shape and location without departing from the spirit of the invention as set forth in the following claims.

I claim:

1. In a humidity control valve, a valve casing having a flexible wall portion, a valve therein, a bracket extending laterally of said valve casing, a hygrostatic control element mounted on said bracket, and a lever connected to said control element and pivotally supported from said bracket, said lever extending through said flexible wall portion to actuate said valve.

2. In a valve of the type stated, a valve casing having a valve chamber therein, a flexible member forming a part of the wall of said chamber, a valve in said chamber, a valve actuating member extending through said flexible member, means supporting said actuating member for movement to actuate said valve, said supporting means being so positioned that fluid pressure on said flexible member tends to move said actuating means in one direction, and a hygrostatic control element for moving said actuating member in the opposite direction.

3. In a valve of the type stated, a valve casing, a valve chamber therein, a sylphon bellows forming a part of the wall of said chamber, a valve in said chamber, a valve actuating member extending through said bellows, a support for said member located at a point offset from the line of application of the force exerted on said lever by said sylphon bellows, and a hygrostatic element for moving said valve actuating member against the force exerted thereon by said sylphon bellows.

4. In a humidity control valve, a casing having inlet and outlet ports, a valve seat and valve between said ports, a valve operator comprising a lever having one end thereof pivotally supported at a point fixed with respect to said casing, a hygrostatic element for moving said operator angularly in one direction, and yielding means opposing movement of said operator in said direction with a force which is greater in closed position of said valve than in open position thereof, said yielding means exerting a force approximately along said lever and in a line offset from said fixed pivotal supporting point by a greater distance when said valve is closed than when the valve is open.

5. In a humidity control valve, a casing having inlet and outlet ports, a valve seat and valve between said ports, a valve operator, a hygrostatic element for moving said operator to open said valve, means restricting the flow of fluid from said inlet port to said valve seat to a lower rate than the flow of fluid from said valve seat to said outlet port when said valve is open, and yielding means comprising a sylphon bellows actuated by the fluid pressure at the inlet side of the valve seat for opposing said movement of the operator with a force which decreases upon the opening of said valve.

6. A valve of the type including a valve casing having a valve chamber therein, a valve port and valve controlling the flow of fluid from said chamber, means actuated by the fluid pressure within said chamber to produce a force opposing opening movement of said valve, and hygrostatic means for opening said valve, characterized by the fact that means is provided for restricting the flow of fluid into said chamber to a lower rate than the flow of fluid from said chamber when said valve is open, whereby the force exerted by said fluid pressure actuated means decreases with the opening of said valve.

7. In a humidity control valve, a valve casing having inlet and outlet ports, a valve chamber between said ports, a seat member in a wall of said chamber, said seat member being counterbored to receive and guide a valve member, said valve member seating in the direction of fluid flow, an actuating member for unseating said valve, a hygrostatic control element for moving said actuating member to unseat said valve, and yielding means opposing movement of said actuating member by said hydrostatic control member.

8. In a humidity cotrol valve, a valve casing, a valve member therein having an intermediate portion of less diameter than its ends, a valve actuator having an opening therethrough in which the reduced diameter section of said valve member is located, one end portion of said valve member having substantially the same transverse dimensions as the opening in said valve actuator, thereby retaining said valve member and valve actuator in assembled relation when the said end portion of the valve member is forced through the opening in said valve actuator, and a hygroscopic control element for moving said valve actuator.

9. In a valve of the type stated, a valve casing having a valve chamber therein, a sylphon bellows forming a part of the wall of said chamber, a valve seat and valve for controlling the flow of fluid from said chamber, a lever for operating said valve and extending to the exterior of said chamber through said sylphon bellows, a bracket connected to said valve casing, means supporting said lever on said bracket and for pivotal movement about a point offset from the line of application of the force exerted upon said lever by said sylphon bellows, a hygrostatic control element on said bracket, and means connecting said control element and said lever.

10. The invention as set forth in claim 9, wherein said pivotal supporting means is so located that the force exerted by said sylphon bellows tends to move said lever to valve-closing position, and said hygrostatic element moves said lever in a valve-opening direction.

JERRY H. SIMPSON.